Figure 1:
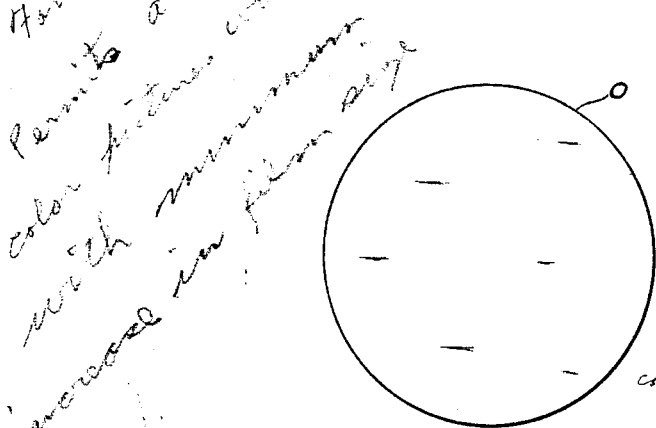

Dec. 15, 1931.   M. WAIDE   1,836,562
OPTICAL SYSTEM AND METHOD FOR PRODUCING PHOTOGRAPHS
AND PROJECTING THE SAME IN NATURAL COLORS
Filed July 26, 1929

INVENTOR.
Merrill Waide,
BY George D. Richards
ATTORNEY.

Patented Dec. 15, 1931

1,836,562

UNITED STATES PATENT OFFICE

MERRILL WAIDE, OF NEWARK, NEW JERSEY, ASSIGNOR TO NATURAL-COLOR, INC., OF NEW YORK, N. Y., A CORPORATION OF DELAWARE

OPTICAL SYSTEM AND METHOD FOR PRODUCING PHOTOGRAPHS AND PROJECTING THE SAME IN NATURAL COLORS

Application filed July 26, 1929. Serial No. 381,149.

This invention relates to a novel optical system for producing photographs and for projecting the same to effect a reproduction of the image of the object in its natural colors, and particularly for moving picture projection.

Most inventions for producing motion pictures in natural colors have involved the photographic recording, simultaneously or successively, of a plurality of geometrically similar images each formed by light of different color value. Many of these inventions have effected projection by using a positive in color consisting of a plurality of dyed positives superimposed in register on one support, thus introducing costly and tedious difficulties in printing as well as imperfections in the image which are well known to the art. Other of these inventions have effected the simultaneous or successive projection of the geometrically similar monochrome images and so superimposing or successively projecting them on the exhibiting screen as to form a composite image which appears to be in natural color, by using the respective colors of light for each of the component images as determined in taking the pictures. These latter inventions employing simultaneous or successive projection, since they employ the additive principle of producing natural colors, since they involve only monochromatic contact printing, and since they produce more brilliant images, would seem to be most productive of correct results and adaptable to commercial and professional use except for certain difficulties which it is the more specific object of this invention to eliminate.

Successive projection of these images has had the chief objection of depending upon the persistence of vision for the blending of the component colors to form a complete image on the retina in natural colors, therefore at any given speed of projection the resultant image is only inversely proportionate in illumination to a projection of complete images as is the number of component colors, or stated differently, a given effect and illumination requires the projection of footage as many times normal as the number of component colors used, with resultant eye strain as well as mechanical difficulties.

Simultaneous projection of these images furnishes a complete natural color image but has heretofore necessitated either a wider or a longer film to carry the plurality of component images of a given size, with the alternative result of either an increase in the width or footage of the film or a limitation in the size of the image on the exhibiting screen. Another difficulty encountered by inventions of this class is the inherent difference in the density and contrast of component positives similarly printed from negatives similarly formed owing to the different actinic effect of light of different color on the same emulsion. Still another difficulty has heretofore been the difference in visual luminosity of component images of different colors when projected by similar positives similarly and equally illuminated by light from a common source.

The chief object of this invention is to furnish a method and a means by which a plurality of monochrome photographs each of a different color value, may be simultaneously formed and subsequently simultaneously projected to form on the screen a natural color image of substantially the same magnification from a given width and footage of film as would be formed by the projection of a black and white monochrome image from the same area of film.

Another object of this invention is to furnish a method and means whereby the relative area of emulsion acted upon by light of a given color may be predetermined and governed by conditions encountered.

A further object of this invention is to furnish a method and means whereby the relative area of positive to be illuminated by a color and strength of light of a given visual luminosity may be predetermined and governed by conditions encountered.

The above mentioned and other objects and advantages as will hereafter appear in the detailed description of one embodiment of this invention, are attained by a novel optical system including essentially a plurality of unlike optical paths for the simultaneous formation of geometrically unlike images of the same object field, a means for obtaining said images of respectively determined color values, and a panchromatic sensitive emulsion for the photographic negative.

One embodiment of this invention is shown in the accompanying drawings and described in the following specification.

Figure 2:
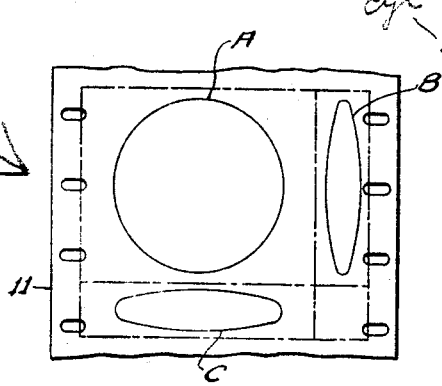
Figure 3:
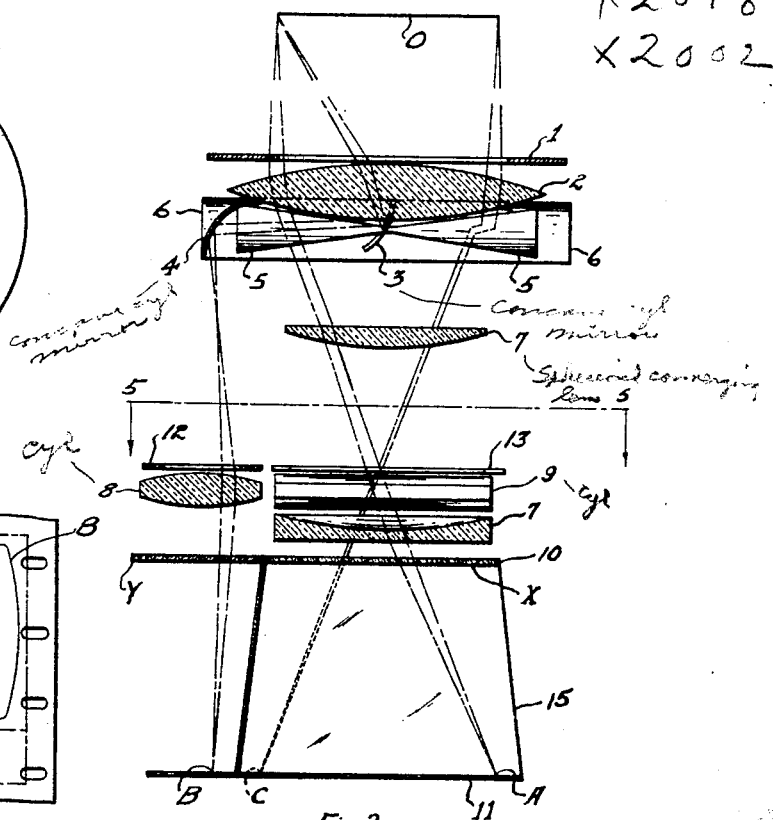
Figure 4:
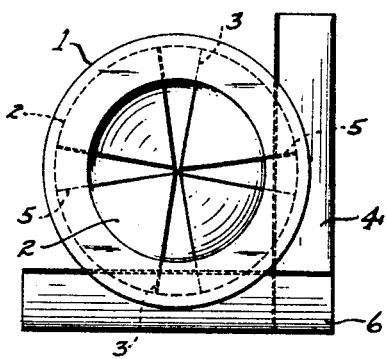
Figure 5:
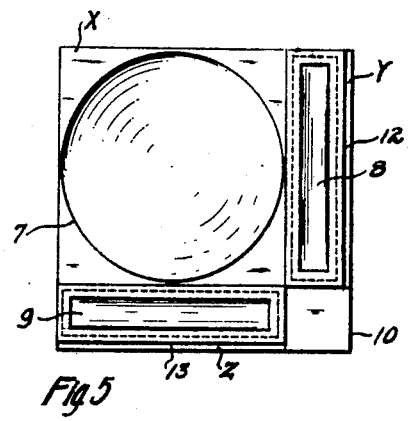

In the accompanying drawings, wherein the same parts are denoted throughout by the same designation, Figure 1 illustrates the object photographed; Figure 2 is a view of a section or frame of film showing the positioning of the three color records A, B, and C made by the device herein described; Figure 3 is an optical diagram schematically showing for camera or projector an embodiment of the invention; Figure 4 is a front elevation of a portion of the structure shown in Fig. 3; and Figure 5 is a front elevation taken along line 5—5 showing the rear lens group and color filter group of Fig. 3.

In Figure 3, 1 is the diaphragm forming the aperture of the system, 2 is a converging lens forming the first element of the objective, 3 is a concave cylindrical mirror preferably placed near the lens 2 as shown, 4 is also a concave cylindrical mirror positioned substantially as shown in Figures 3 and 4 and so that the central axes of the cylinders of which the mirrors 3 and 4 are parts are parallel. The numeral 5 designates a mirror similar to 3 and likewise positioned as shown with the axis of its cylinder perpendicular to that of 3, and 6 is a mirror similar to 4 and positioned parallel to 5. The numeral 7 designates a converging spherical compound telephoto lens forming part of the objective for forming the largest photograph. The numeral 8 designates a converging cylindrical lens section so placed that it is active in the same axis with mirrors 3 and 4 and 9 is a converging cylindrical lens section positioned below lens group 7 and active in the same axis with mirrors 5 and 6. The numeral 10 designates a color filter group having sections of the respective colors X, Y, and Z which are active in the axes of lens 7, 8 and 9 respectively. The numeral 11 designates the negative film positioned in the common focal plane of the three unlike systems, 12 is a diaphragm for lens 8, and 13 is a diaphragm for lens 9 while 14 and 15 are partitions between the three optical paths.

The color record A of the object O is formed on the film 11 by the system of lenses 2 and 7 and the color filter section X. The color record B is formed by rays from object O which have been converged by lens 2 and further converged by mirrors 3 and 4 and lens 8 in one axis but only by lens 2 in the other axis and which rays pass through the color filter section Y. The record B is a deformed image, as in one dimension it is an inverted image formed by lens 2 only, but in the other dimension it is an erect image reformed by lens 8 from the aerial image formed by lens 2 and mirror 3 after the light has been reconverged by mirror 4 so as to reform a pupil at lens 8. Color record C is a deformed image of the object O having the color value Z formed in one dimension by lens 2 only and in the other dimension by lens 2 and mirrors 5 and 6 and lens 9 in a manner analagous to the formation of color record B. It will be apparent that by varying the focal lengths of mirrors 3 and 4 the proportions of the image B may be varied. Likewise by varying the focal lengths of mirrors 5 and 6 the proportions of the image C may be varied. Thus, by using mirrors of varying focal lengths, a simple means is provided for varying the sizes of the respective images B and C independently of one another in accordance with the actinic effects or values of the color filters Y and Z respectively. In Fig. 3 representative rays from points on the object O are traced to their points of projection on the film 11.

The aperture of the system is governed by the diaphragm 1 which has suitable mechanical means for closing and opening. The relative apertures of the separate systems are regulated by the diaphragms 12 and 13 for the lenses 8 and 9 respectively.

It will be apparent to one skilled in the art that each of the lenses and mirrors may be so mounted as to be independently movable and the mirrors can be rotated for placement of the respective images.

All of the three component systems have, in both axes, a common focal plane wherein the records are situated.

For projecting, although many variations may be made, a positive film printed from a black and white negative made by this system may be placed at 11 and each record suitably illuminated through the same or respectively corresponding color filters or by suitably colored light with equal or unequal intensities of light as determined and a natural color image of the object field projected upon the screen by the system and device here described.

Since one color record is of normal size and dimensions and is of the color value visually most important for the determination of detail in the projected image, this color record produces a monochrome image of normal magnification. The two other primary colors are added from the deformed image records, each respective deformed image being of full size in one direction which extends at right angles to the full-sized direction of the other deformed image and superimposing without relative magnification on the first image in one direction each. Since these full size dimensions are in different directions for the two added images, without relative magnification, they coincide with each other and with the projected undeformed record to form white and all compound colors in exact register in this regard. Therefore there are only two primary colors which need excessive magnification each in one direction only. In practice the registry is so nearly perfect that the eye sees as perfect a result as if the images had all been normal and full size because of the visual blending of the specks as in a screen plate where all of the colors are side by side instead of superimposed. Also, there is no eye strain as in successive projection, nor no tinting of the entire picture falsely as in the case of processes where one of the colors is added by tinting the entire film or by adding light of one hue.

The principle of this optical system in different embodiments may be adapted to a large variety of the methods of splitting the light from a single objective or from adjacent objectives and may also be adapted to processes obtaining color records without color filters as described in my co-pending application for Patent Ser. No. 358,178, filed April 26, 1929.

It will be obvious that there are possible numerous embodiments of my invention and I claim any and all of these that fall within the scope of the following claims:

1. A method of producing images on negative films for natural color photography which consists in converging rays from an object in steps, all of said rays being converged initially about two axes at right angles to one another, certain of said rays being further converged about the two said axes to form an undistorted image upon a negative film, and others of said rays being further converged about a single one of said axes and passed through a color filter to form a distorted monochrome image upon said negative film adjacent said first named image.

2. The method of producing images on negative films for natural color photography which consists in converging rays from an object in steps, all of said rays being converged initially about two axes at right angles to one another, certain of said rays being further converged about the two said axes and then passed through a color filter to subsequently form an undistorted monochrome image upon a negative film, and others of said rays being further converged about a single one of said axes and passed through another color filter to form a distorted monochrome image upon said negative film, said last named monochrome image being of different color value from the first named image.

3. A method of producing images on negative films for natural color photography which consists in converging rays from an object in steps, all of said rays being converged initially about two axes at right angles to one another, one group of said rays being further converged about the two said axes to form an undistorted image upon a negative film, a second group of said rays being further converged about one of said axes and passed through a color filter to form a distorted monochrome image upon said negative film, and a third group of said rays being further converged about the other of said axes and passed through another color filter to form a distorted monochrome image upon said negative film.

4. A method of producing images on negative films for natural color photography which consists in converging rays from an object in steps, all of said rays being converged initially about two axes at right angles to one another, one group of said rays being further converged about the two said axes to form an undistorted image upon a negative film, a second group of said rays being further converged about one of said axes and passed through a color filter to form a distorted monochrome image upon said negative film, and a third group of rays being further converged about the other of said axes and passed through another color filter to form a distorted monochrome image upon said negative film, said several images being in close proximity to one another and disposed so that the major axis of one of said distorted images extends at right angles to the major axis of the other of said distorted images.

5. A method of producing images on negative films for natural color photography by dissimilar optical systems which consists in converging rays from an object in steps, all of said rays being converged initially by an objective about two axes at right angles to one another, one group of said rays being further converged about the two said axes by a lens system and then passed through a color filter to form an undistorted monochrome image upon a negative film, a second group of said rays being further converged by a mirror-lens system about one of said axes and passed through a second color filter to form a distorted monochrome image upon said negative film, and a third group of rays being further converged by a second mirror-lens system about the other of said axes and passed through a third color filter to form a distorted monochrome image upon said negative film, said several images being in close proximity to one another and disposed so that the major axis of one of said distorted images extends a right angles to the major axis of the other of said distorted images.

6. An optical system for taking pictures for projection in natural colors comprising, an objective, a lens system arranged behind said objective and acting in conjunction therewith for forming an undistorted image of an object upon a negative film, converging mirror means positioned adjacent said objective and adapted for converging a portion of the rays passing through said objective about a single axis, lens means active about a single axis common to the active axis of said converging mirror means for further converging the rays delivered from said mirror means, and a color filter positioned intermediate said lens means and the negative film, said mirror and lens means cooperating with said objective and said color filter to form a distorted image of the object upon the said negative film.

7. An optical system for taking pictures for projection in natural colors comprising, a single objective, a lens system arranged behind and in alignment with said objective for forming an undistorted image of an object upon a negative film adapted to be positioned behind said objective, a pair of spaced cooperating converging mirrors positioned adjacent said objective and adapted for converging a portion of the rays passing through said objective about a single axis, a converging lens arranged in the path of the rays converged by said mirrors and active in the same axis as said mirrors, and a color filter positioned intermediate said lens and the negative film, said mirrors, said lens and said color filter cooperating to form a distorted image of the object upon the said negative film adjacent said undistorted image.

8. An optical system for taking pictures for projection in natural colors comprising, an objective, lens means positioned rearwardly of said objective for forming a normal image of an object field upon a focal plane, cooperating mirror-lens means also positioned rearwardly of said objective for forming a distorted image of said object field upon said focal plane, and means for imparting color value to said distorted image.

9. An optical system for taking pictures for projection in natural colors comprising, an objective, lens means positioned rearwardly of said objective for forming a normal image of an object field upon a focal plane, a plurality of sets of converging mirrors and cooperating lenses also positioned rearwardly of said objective for forming a plurality of distorted images of said object field upon said focal plane, and means for imparting different color values to said several images.

10. An optical system for taking pictures for projection in natural colors comprising, an objective, lens means positioned rearwardly of said objective for forming a normal image of an object field upon a negative film, a pair of spaced, vertically extending, concave mirrors positioned adjacent said objective and having a common axis, a vertically extending cylindrical lens disposed in the common axis of said mirrors, said mirrors and said lens cooperating to converge said object field in said common axis to form a narrow distorted image of said object field upon said negative film adjacent said undistorted image and means positioned forwardly of said film for imparting color values to said images.

11. An optical system for taking pictures for projection in natural colors comprising, an objective, lens means positioned rearwardly of said objective for forming a normal image of an object field upon a negative film, a pair of spaced, vertically extending, concave mirrors positioned adjacent said objective and having a common axis, a vertically extending cylindrical lens disposed in the common axis of said mirrors, said mirrors and said lens cooperating to converge said object field in said common axis to form a narrow distorted image of said object field upon said negative film adjacent one side of said undistorted image, a pair of spaced, horizontally extending, concave mirrors positioned adjacent said objective and having a common axis, a horizontally extending cylindrical lens disposed in the common axis of said horizontally disposed mirrors, said mirrors and said lens cooperating to converge said object field in said common horizontal axis to form a narrow distorted image of said object field upon said negative film adjacent the bottom of said undistorted image, and color filter means positioned forwardly of said film for imparting different color values to said several images.

MERRILL WAIDE.